United States Patent
Kamakura et al.

(10) Patent No.: US 8,152,604 B2
(45) Date of Patent: Apr. 10, 2012

(54) DETECTING STRUCTURE FOR A STUFFING APPARATUS

(75) Inventors: Yoshinori Kamakura, Kanagawa (JP); Tatsuo Nakamura, Kanagawa (JP); Katsuya Tanabe, Kanagawa (JP)

(73) Assignee: HITEC Co., Ltd., Kanagawa (JP)

( * ) Notice: Subject to any disclaimer, the term of this patent is extended or adjusted under 35 U.S.C. 154(b) by 127 days.

(21) Appl. No.: 12/784,227

(22) Filed: May 20, 2010

(65) Prior Publication Data

US 2011/0021124 A1 Jan. 27, 2011

(30) Foreign Application Priority Data

May 22, 2009 (JP) ................................. 2009-124555

(51) Int. Cl.
*A22C 11/00* (2006.01)
(52) U.S. Cl. ........................................................ 452/32
(58) Field of Classification Search .............. 452/21–26, 452/30–32, 35–37, 46–48, 51
See application file for complete search history.

(56) References Cited

U.S. PATENT DOCUMENTS

| | | | | |
|---|---|---|---|---|
| 4,768,261 | A | * | 9/1988 | Nakamura ...................... 452/33 |
| 5,149,294 | A | * | 9/1992 | Storesund ...................... 452/10 |
| 5,600,308 | A | * | 2/1997 | Corpeny et al. .............. 340/675 |
| 5,788,563 | A | * | 8/1998 | Nakamura et al. ............. 452/47 |
| 5,921,857 | A | * | 7/1999 | Simpson ........................ 452/31 |
| 6,050,888 | A | * | 4/2000 | Nakamura et al. ............. 452/47 |
| 6,964,605 | B2 | * | 11/2005 | Kasai et al. .................... 452/32 |
| 7,066,803 | B2 | | 6/2006 | Arnote, Jr. et al. | |

FOREIGN PATENT DOCUMENTS

JP 3723656 10/1997
WO 0047053 8/2000

OTHER PUBLICATIONS

KEYENCE Catalog, RGB Digital Fiberoptic Sensors, CZ-V20 Series, KEYENCE Corporation, 2004 CZV20-KA-C-E-0120 0114-3.
KEYENCE Manual, RGB Digital Fiberoptic Sensor, CZ-V21A(P)/V22A(P), Instruction Manual, KEYENCE Corporation, 2005, 0076-3, 96M1382.

* cited by examiner

*Primary Examiner* — Richard Price, Jr.
(74) *Attorney, Agent, or Firm* — Bachman & LaPointe, P.C.

(57) ABSTRACT

A detecting structure for a stuffing apparatus includes: a stuffing nozzle having a material discharge port and a photoelectric sensor for detecting a terminating end of a casing loaded on an outer periphery of the stuffing nozzle, wherein the photoelectric sensor is accommodated in a protective case having a transparent portion, and a first air supplying arrangement for supplying air into the protective case is provided on the protective case. Further, the first air supplying arrangement may have an air nozzle which is provided in the protective case and jets air toward an inner surface of the transparent portion. Still further, second air supplying arrangement may be provided for supplying air toward an outer surface of the transparent portion. Furthermore, third air supplying arrangement may be provided for supplying air toward the casing.

7 Claims, 12 Drawing Sheets

DETECTING STRUCTURE FOR A STUFFING APPARATUS

BACKGROUND OF THE INVENTION

The present invention relates to a detecting structure for a stuffing apparatus for manufacturing a chain of stuffed products, e.g., sausages or the like, by using natural intestine casings or artificial casings, and more particularly to a casing detecting structure.

A conventional chain of sausage products is manufactured by stuffing a material into a casing of an animal intestine such as a sheep intestine or a hog intestine, or an artificial casing such as a cellulose casing or a collagen casing. Meanwhile, since a stuffing apparatus is automatically operated to complete the stuffing into one casing, it is necessary to accurately detect the terminating end of the casing and speedily load a new casing.

A conventional detecting structure is shown in FIG. 12. A stuffing apparatus 1 includes, among others, a stuffing nozzle 3 for feeding a material such as meat into a casing 2; a stuffing pump 4 for feeding the material into the stuffing nozzle 3; a stuffing nozzle rotating means 5 (only a pulley is shown in the drawing) for rotating the stuffing nozzle 3; a braking member 6 which is engaged with the casing 2; and a pincher device 8 for pinching a stuffed casing 7 in which the material has been stuffed. As the material is fed from the stuffing pump 4 into the stuffing nozzle 3, and the casing 2 loaded on the outer periphery of the stuffing nozzle 3 is rotated together with the stuffing nozzle 3 and the braking member 6, the material in the stuffing nozzle 3 is filled into the casing 2, and the casing 7 with the material filled therein is pinched by the pincher device 8.

In addition, a casing pushing member 9 is movably fitted on the stuffing nozzle 3, and this casing pushing member 9 pushes a trailing end portion 2a of the casing 2 toward the pincher device 8 side which is a forward side. Reference numeral 10 denotes a detecting means for detecting a terminating end of the trailing end portion 2a of the casing 2, and when the terminating end of the casing 2 is detected by this detecting means 10, the rotation and the like of the stuffing pump 4, the stuffing nozzle 3, and the braking member 6 are stopped. Subsequently, a new casing 2 is loaded again onto the stuffing nozzle 3, and the operation is resumed, see Japanese Pat. No. 3723656.

SUMMARY OF THE INVENTION

The above-described detecting structure is able to detect the terminating end of the casing by the detecting means and render the operation of the stuffing apparatus satisfactory, but in order to detect the terminating end of the casing, it is necessary to position the detecting means in the vicinity of the casing. Meanwhile, since the above-described stuffing apparatus is subjected to cleaning with warm water and a new casing is loaded after stopping the stuffing apparatus, water, material, and the like are scattered onto the stuffing apparatus and are adhered thereto from place to place, so that if such water or the like is adhered to the detecting means, accurate detection becomes impossible.

To overcome such an adverse effect, it is conceivable to cover the detecting means excluding a detecting part with a cover. However, even if the detecting means is covered with the cover, it is impossible to completely prevent the adverse effect of adhesion of the scattering water or the like to the detecting part.

A protective case for completely covering the detecting means of the stuffing apparatus is conceivable. Incidentally, since the stuffing apparatus becomes stained, after the stuffing operation is finished, the stuffing apparatus is subjected to cleaning with warm water of about 40° C. or more in a stuffing workroom where the room temperature is set to 10 to 15° C., and the operation is subsequently resumed. Then, dew condensation occurs on inner surfaces of the protective case after cleaning owing to a temperature difference between at the time of cleaning and after cleaning, so that there occurs a problem in that accurate detection cannot be effected during the operation after cleaning.

In addition, even if the protective case is provided, water and the like become adhered to the upper surface of the protective case, and there still occurs the possibility that accurate detection cannot be effected continuously.

Furthermore, in the case where the terminating end of the casing is detected by a photoelectric sensor of the detecting means in the above-described detecting structure, there are cases where the trailing end portion of the casing in a state of being shirred in the longitudinal direction of the stuffing nozzle passes a point of irradiation by the photoelectric sensor without being stretched. Hence, there still occurs the problem that accurate detection cannot be effected continuously.

An object of the present invention is to overcome the drawbacks of the above-described conventional detecting structure, i.e., to provide a casing detecting structure for a stuffing apparatus which is capable of more accurately effecting the detection by the detecting means.

The characteristic features of the present invention lie in the following.

The invention is a detecting structure for a stuffing apparatus comprising: a stuffing nozzle having a material discharge port and a photoelectric sensor for detecting a terminating end of a casing loaded on an outer periphery of the stuffing nozzle, wherein the photoelectric sensor is accommodated in a protective case having a transparent portion, and air supplying means for supplying air into the protective case is provided on the protective case.

The invention lies in that, in addition to the construction set forth above, the air supplying means has an air nozzle which is provided in the protective case and jets air toward an inner surface of the transparent portion.

The invention lies in that, in addition to the construction set forth above, a second air supplying means is provided for supplying air toward an outer surface of the transparent portion.

The invention lies in that, in addition to the construction set forth above, a third air supplying means is provided for supplying air toward the casing.

The invention lies in that, in addition to the construction set forth above, a direction of supplying air by the third air supplying means is offset from an axis of the stuffing nozzle toward a rotating direction side of the stuffing nozzle.

The invention lies in that, in addition to the construction set forth above, a casing pushing member for pushing a trailing end portion of the casing is stopped short of the photoelectric sensor.

The invention lies in that, in addition to the construction set forth above, the photoelectric sensor has an optical transmitter and an optical receiver, the optical transmitter has three light-emitting elements which respectively emit three primary colors of light, and the optical receiver generates electrical signals corresponding to quantities of light received in response to the respective three primary colors of light.

In the invention, since the photoelectric sensor is accommodated in a protective case having a transparent portion, and air supplying means for supplying air into the protective case is provided, it is possible to prevent the direct adhesion of water and the like to the photoelectric sensor. Even if water or the like is adhered to the outer surface of the transparent portion of the protective case, the water or the like flows down the transparent portion, or can be easily removed by such means as a cloth or air, so that the detection of the casing by the photoelectric sensor can be effected accurately. In addition, it is possible to prevent the adverse effect of the occurrence of dew condensation on the inner surface of the protective case due to the temperature difference, and the detection of the casing by the photoelectric sensor can be effected more accurately. In addition, it is possible to prevent early failure of the photoelectric sensor caused by the occurrence of dew condensation on the photoelectric sensor due to the temperature difference.

In the invention, since an air nozzle for jetting air toward the inner surface of the transparent portion is provided, the adverse effect of the occurrence of dew condensation on the inner surface of the protective case due to the temperature difference can be efficiently prevented by a small amount of air. In addition, it is possible to prevent early failure of the photoelectric sensor caused by the occurrence of dew condensation on the photoelectric sensor due to the temperature difference.

In the invention, since second air supplying means is provided for supplying air toward the outer surface of the transparent portion, the water and the material or the like adhering to the outer surface of the protective case can be removed automatically and continuously by air, so that the detection of the casing by the photoelectric sensor can be effected more accurately.

In the invention, since third air supplying means is provided for supplying air toward the casing, in addition to the advantages of the invention as set forth above, particularly in the case of a natural intestine casing, the casing in the shirred state from the vicinity of its trailing end portion to the terminating end of the trailing end portion can be stretched more reliably, with the result that it is possible to more accurately effect the detection of the stretched casing terminating end by the photoelectric sensor. In addition, since the casing trailing end portion is stretched, the material can be filled up to the vicinity of the casing terminating end.

In the invention, since the direction of supplying air by the third air supplying means is offset from the axis of the stuffing nozzle toward the rotating direction side of the stuffing nozzle, in addition to the advantages of the invention as set forth above, particularly in the case of a natural intestine casing, it is possible to more reliably prevent the adverse effect of the casing being wrapped around and onto the stuffing tube.

In the invention, since a casing pushing member for pushing the trailing end portion of the casing is stopped short of the photoelectric sensor, in addition to the advantages of the invention as set forth above, particularly in the case of a natural intestine casing, the casing trailing end portion is set in a free state after the casing pushing member has stopped, so that the pressing force in the axial direction of the stuffing tube, which is applied to the casing in the shirred state, decreases, thereby allowing the casing trailing end portion to be stretched more reliably. Hence, it is possible to more reliably prevent the wrapping around and onto the stuffing tube, and it is possible to more accurately effect the detection of the stretched casing terminating end by the photoelectric sensor. Furthermore, since the casing trailing end portion is stretched, the material can be filled up to the vicinity of the casing terminating end.

In the invention, since the photoelectric sensor is constituted by an optical transmitter having three light-emitting elements which respectively emit three primary colors of light and by an optical receiver generating electrical signals corresponding to quantities of light received in response to the respective three primary colors of light, in addition to the advantages of the invention as set forth above, particularly in the case of a natural intestine casing, the terminating end of the casing can be detected more reliably. Namely, the quantity of light received from the shirred casing, the quantity of light received from the stretched casing, and the quantity of light received from the stuffing tube differ. Therefore, by detecting the quantity of light received from the stuffing tube by using the photoelectric sensor which is capable of detecting such different quantifies of light, it becomes possible to accurately detect the timing of transition from the casing terminating end to the stuffing tube.

DETAILED DESCRIPTION

Figure 1:
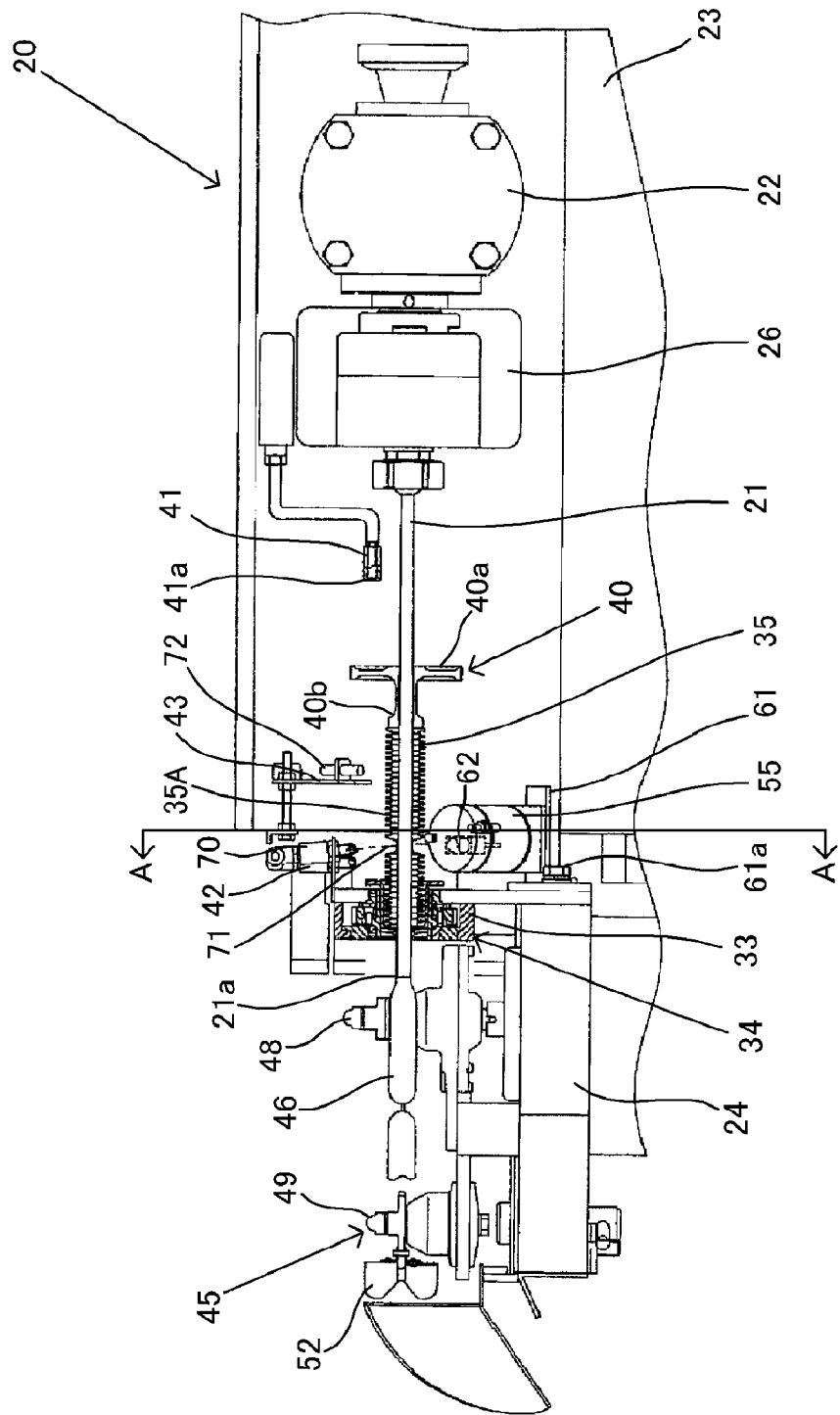
FIG. 1 is a front elevational view of a detecting structure for a stuffing apparatus in accordance with the invention.

Hereafter, a description will be given of an embodiment of the present invention with reference to the drawings. It should be noted that it is assumed that, in FIG. 1, a stuffing pump 22 side is a backward side and that a pincher device 45 side is a forward side, and a side perpendicular to the front-back direction will be referred to as a left-right direction side. A stuffing apparatus 20 includes a stuffing nozzle 21, the stuffing pump 22, a braking mechanism 34 (FIG. 9), the pincher device 45, and the like.

Figure 2:
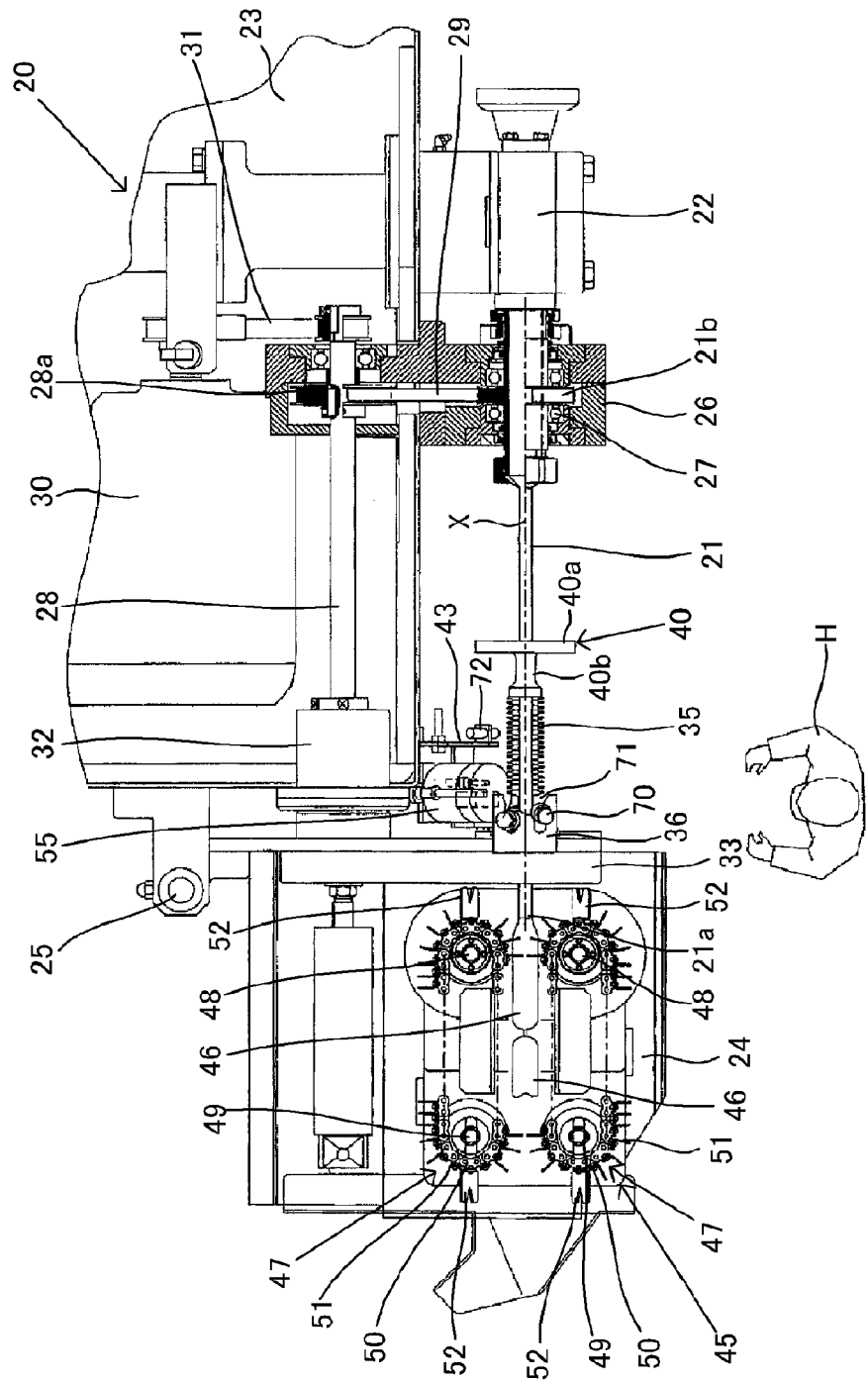
FIG. 2 is a plan view of the detecting structure for a stuffing apparatus in accordance with the invention.

Further, the stuffing nozzle 21, the stuffing pump 22, and the like are mounted on a first stand 23, and the braking mechanism 34, the pincher device 45, and the like are mounted on a second stand 24. It should be noted that the second stand 24 is made rotatable about a hinge shaft 25 with respect to the first stand 23, and when an operator H loads a new casing onto the stuffing nozzle 21, the second stand 24 is rotated to load a new casing onto the stuffing nozzle 21 (FIG. 2).

The stuffing nozzle 21 is a straight pipe member having the shape of a round pipe and is provided horizontally, one end thereof being connected to the aforementioned stuffing pump 22, the other end thereof being set in an open state so as to form a discharge port 21*a* for the material. Further, a casing 35 which is shirred and has a plurality of bellows-like creases is loaded onto the outer periphery of the stuffing nozzle 21. This casing 35 is formed of a natural intestine of such as a sheep or a hog. In addition, a first block 26 is provided on the aforementioned first stand 23. The stuffing nozzle 21 is passed through this first block 26, and is fixed to a first pulley 21*b* which is rotatably axially supported by an internal bearing 27.

Further, an intermediate shaft 28 is rotatably axially supported within the first block 26, and the stuffing nozzle 21 and the intermediate shaft 28 are connected to each other through the first pulley 21*b*, a second pulley 28*a* mounted on the intermediate shaft 28, and a first belt 29. In addition, the intermediate shaft 28 is connected to a stuffing nozzle rotating motor 30, which is a stuffing nozzle rotating means, through a second belt 31, and the stuffing nozzle rotating motor 30 rotates the stuffing nozzle 21 through the second belt 31, the intermediate shaft 28, and the first belt 29 (FIG. 2).

Figure 9:
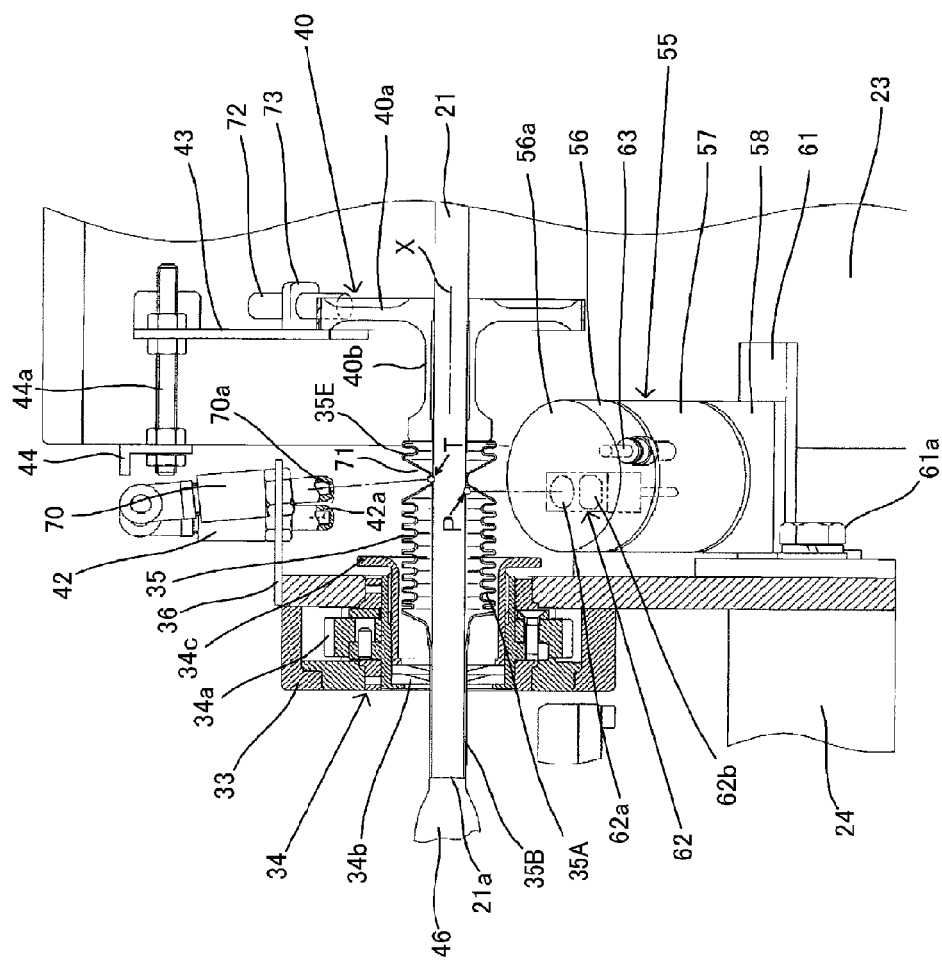
FIG. 9 is an enlarged cross-sectional view of a third air supplying means (casing-use air nozzle) and its vicinity (however, an upper surface-use air nozzle is omitted).

The intermediate shaft 28 is further connected to the braking mechanism 34 provided on a second block 33 on the second stand 24 through a clutch 32. As shown in FIG. 9, this braking mechanism 34 has a rotator pulley 34*a*, a braking member 34*b*, and a braking member holder 34*c*.

Further, the rotator pulley 34*a* is connected to the aforementioned intermediate shaft 28 through an unillustrated belt, and is rotated in interlocking relation to the intermediate shaft 28. In addition, the braking member 34*b* is constituted by a plurality of ring-like rubber-made packings, its inner peripheral end is formed into a tapered shape, and the braking member 34*b* presses at its distal end the stretched casing 35 against the stuffing nozzle 21. The aforementioned braking member holder 34*c* is a member which has its outer peripheral surface threadedly engaged with an inner peripheral surface of the rotator pulley 34*a*, and presses the braking member 34*b* by its distal end on the forward side, the braking member holder 34*c* being rotated by the rotator pulley 34*a* together with the braking member 34*b*. By means of this braking mechanism 34, the casing 35 is rotated together with the stuffing nozzle 21, and a twist is imparted to the casing 35 forwardly of the discharge port 21*a* of the stuffing nozzle 21.

The aforementioned stuffing pump 22 is variably controlled by an unillustrated motor and feeds the material such as meat into the hollow portion of the stuffing nozzle 21, and its driving is stopped by an unillustrated controller which receives a signal from a below-described photoelectric sensor 62.

Reference numeral 40 denotes a casing pushing member. The casing pushing member 40 is an integral member consisting of a disk portion 40*a* and a columnar portion 40*b* projecting outward from the center of the disk portion 40*a* perpendicularly thereto. An opening with an inside diameter greater than the outside diameter of the stuffing nozzle 21 is provided in the center of the columnar portion 40*b*. As this opening is fitted onto the outer periphery of the stuffing nozzle 21, the casing pushing member 40 is made movable on the outer periphery of the stuffing nozzle 21 in the front-back direction. Further, a trailing end portion 35E of the casing 35 is pressed in the forward direction by a distal end of the columnar portion 40*b*, so as to forwardly push a casing 35A in the state of being shirred in the direction of an axis X of the stuffing nozzle 21.

Reference numeral 41 denotes a pushing-use air nozzle which is a fifth air supplying means. As shown in FIG. 1, the pushing-use air nozzle 41 is mounted on an upper portion of the first stand 23 adjacently to the first block 26. The pushing-use air nozzle 41 is provided with a small-diameter air jet orifice 41*a* which is oriented toward the casing pushing member 40.

Reference numeral 42 denotes a returning-use air nozzle which is a fourth air supplying means. As shown in FIG. 9, the returning-use air nozzle 42 is mounted on an air nozzle supporting plate 36 attached to the second stand 24. The returning-use air nozzle 42 is provided with a small-diameter air jet orifice 42*a* which is oriented toward the casing pushing member 40.

Figure 3:
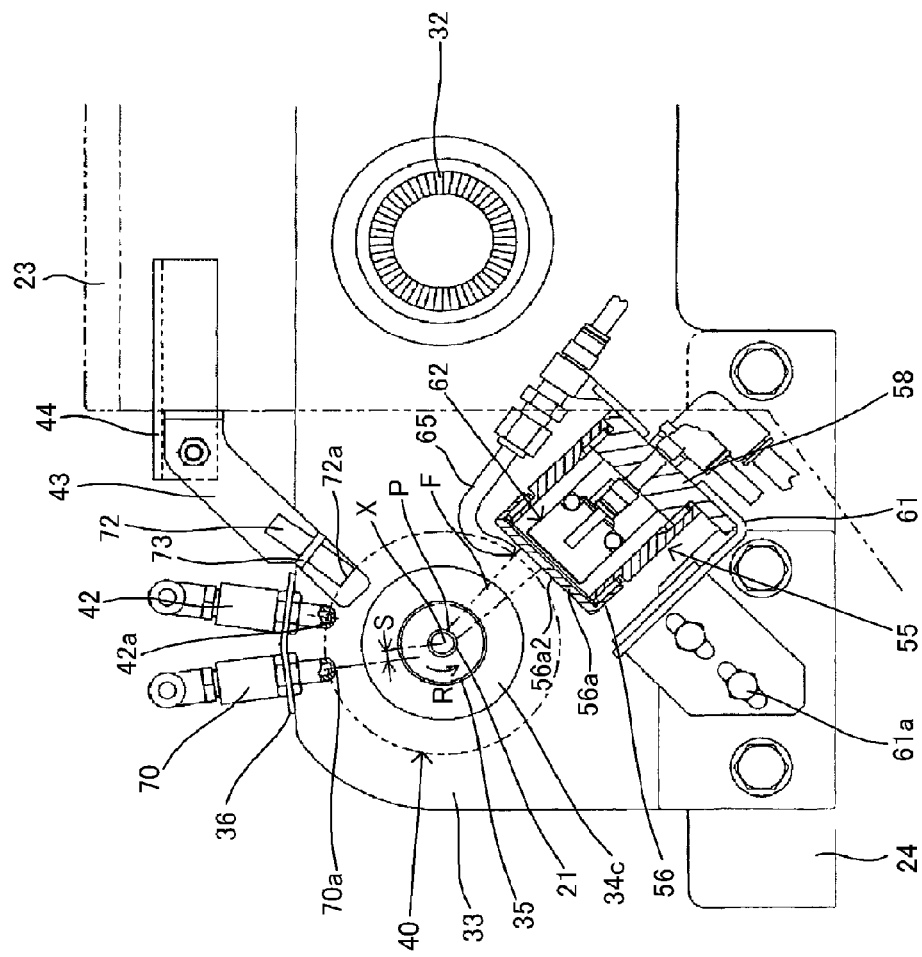
FIG. 3 is a view taken from the direction of line A-A in FIG. 1.

Reference numeral 43 denotes a stopper for stopping the casing pushing member 40 on the backward side of a below-described photoelectric sensor 62. As shown in FIGS. 3 and 9, the stopper 43 is mounted on a threaded member 44*a* secured to a stopper supporting plate 44 which is mounted on an upper portion of the first stand 23, such that its position is adjustable in the direction of the axis X of the stuffing nozzle 21.

The casing pushing member 40 is pushed to the forward side by the air from the pushing-use air nozzle 41 (FIG. 1), and is returned to the backward side by the aforementioned returning-use air nozzle 42 (FIGS. 1 and 3) provided above in the vicinity of a below-described protective case 55. It should be noted that this casing pushing member 40 is pushed to the forward side by air which is supplied for 1 second from the pushing-use air nozzle 41, and is returned to the backward side by air which is supplied for 0.3 second from the returning-use air nozzle 42. Thus, air is consecutively supplied intermittently from the respective air nozzles 41 and 42 so as to move the casing pushing member 40 to the forward side while moving the casing pushing member 40 in the front-back direction.

As the casing pushing member 40 is moved to the forward side while being moved in the front-back direction, it is possible to alleviate the force which is constantly applied to the trailing end portion 35E of the casing 35, thereby making it possible to mitigate the adverse effect of the trailing end portion 35E of the casing 35 being wrapped around and onto the stuffing nozzle 21. Furthermore, as will be described later, it becomes easy for the casing 35A in the shirred state to be drawn out from the braking member 34*b*. It should be noted that the casing pushing member 40 may be moved continuously to the forward side.

Figure 11:
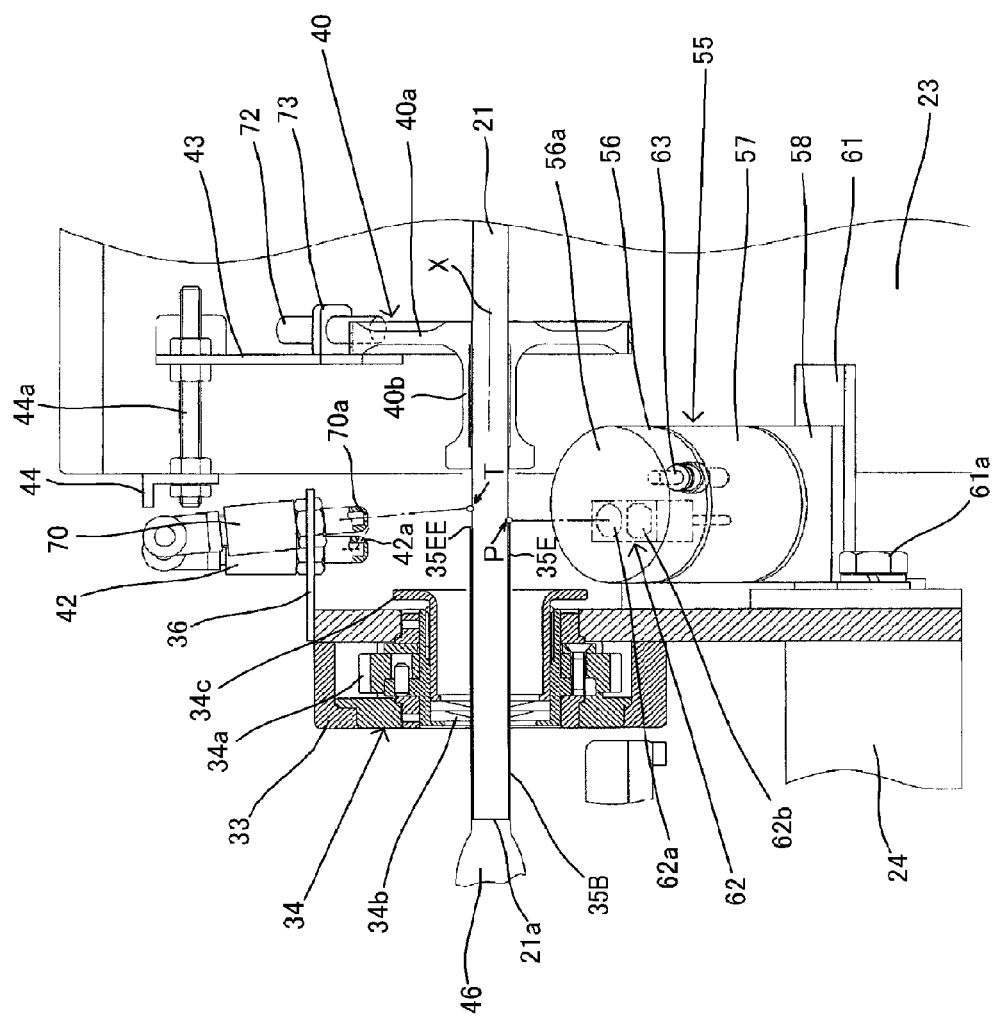
FIG. 11 is a diagram illustrating the state of the terminating end and its vicinity of the casing which is drawing even closer to an end than in FIG. 10.
Figure 12:
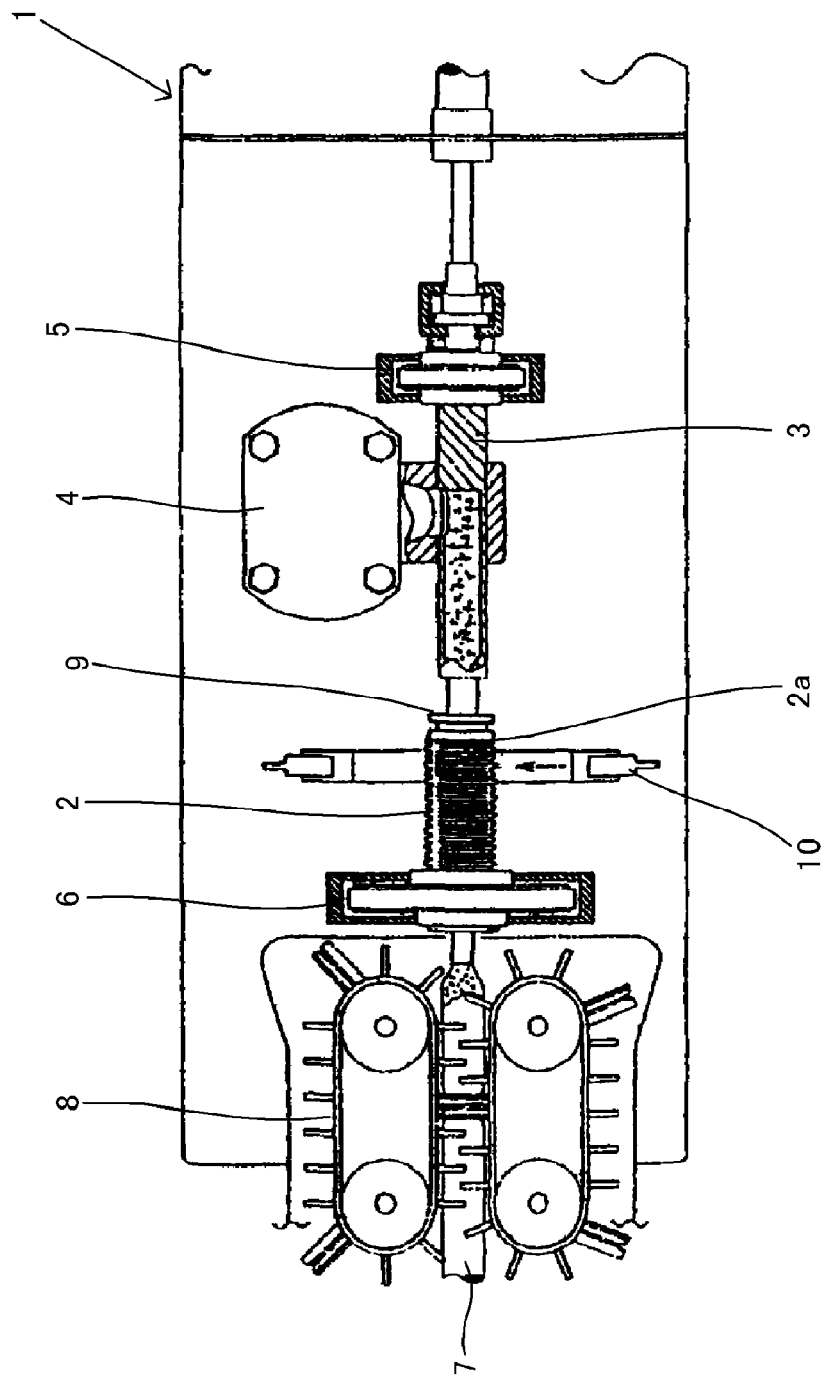
FIG. 12 is a diagram illustrating a conventional detecting structure for a stuffing apparatus.

Further, the above-described stopper 43 is disposed slightly backwardly of the below-described protective case 55, and when the casing pushing member 40 abuts against this stopper 43, any further advance, i.e., the operation of pushing the trailing end portion 35E of the casing 35, is prevented. In order to allow the trailing end portion 35E of the casing in the shirred state, which has ceased to be pushed by the casing pushing member 40 and is hence set in a free state, to be formed into the trailing end portion 35E in a deshirred state stretched in the direction of the axis X of the stuffing nozzle 21, a below-described casing-use air nozzle 70, which is a third air supplying means, is provided, and air is arranged to be jetted by this casing-use air nozzle 70 toward the trailing end portion 35E which moves to the forward side by being pulled by the below-described pincher device 45. Thus, the trailing end portion 35E of the casing is reliably stretched to ensure that a terminating end 35EE of the casing can be reliably detected by the photoelectric sensor 62 (FIG. 11).

Reference numeral 45 denotes the pincher device, and the pincher device 45 pinches a stuffed casing 46 with the material stuffed therein and transports it forwardly of the stuffing nozzle 21. The pincher device 45 is formed by arranging a pair of wrapping connector means 47 in parallel. Each of the wrapping connector means 47 has a drive shaft 48, a driven shaft 49, and a chain 50 wound around and trained between the drive shaft 48 and the driven shaft 49. The chain 50 has a plurality of lugs 51 and a plurality of pincher members 52. It should be noted that the lug 51 is a member which holds from both sides the outer periphery of the stuffed casing 46, and the pincher member 52 is a member having a substantially V-shaped cross section so as to form an end portion in the stuffed casing 46 and cause a twist in that end portion.

Then, when the pair of wrapping connector means 47 disposed in parallel rotate, the plurality of lugs 51 of the respective wrapping connector means 47 feed the stuffed casing 46 to the forward side in a form of pinching it, while the plurality of pincher members 52 of each wrapping connector means 47 constrict the stuffed casing 46 to form end portions. In consequence, a twisted portion is formed at the constricted portion by the rotation of the stuffing nozzle 21.

A brief description will be given of the operation of the stuffing apparatus. The second stand 24 is opened, the casing 35 is loaded onto the stuffing nozzle 21, and its leading end is manually pulled out forwardly of the stuffing nozzle 21 to allow the casing 35 to be suspended a predetermined length from the discharge port 21a which is the distal end of the stuffing nozzle 21. When the operation of the apparatus is started, a predetermined quantity of material is continuously discharged into the casing 35 suspended from the discharge port 21a, and the stuffed casing 46 thus formed moves toward the pincher device 45 while pulling out the casing 35 on the stuffing nozzle 21 owing to the stuffing pressure.

The pincher members 52 of the pincher device 45 move from the backward side toward the forward side of the discharge port 21a in close proximity to the outer periphery of the casing 35 on the stuffing nozzle 21, and start to constrict the stuffed casing 46 at a position close to the discharge port 21a. The pincher members 52 continue their movement about the drive shaft 48 and, after completion of the constriction of the stuffed casing 46, the pincher members 52 pull the stuffed casing 46 along the axis X of the stuffing nozzle 21 and transport it to the forward side while maintaining the constricting state. Since the stuffed casing 46 is pulled and transported by the pincher members 52, the casing 35 on the stuffing nozzle 21 moves while being also subjected to the action of the braking mechanism 34 and being stretched to the forward side in the direction of the axis X of the stuffing nozzle 21, and pulls the casing 35A shirred in the direction of the axis X of the stuffing nozzle 21. The shirred casing 35A undergoes a reduction in its diameter while being stretched, and is formed into a casing 35B in the deshirred state.

Since the casing 35B in the deshirred state formed along the axis X of the stuffing nozzle 21 is constantly pulled on the stuffing nozzle 21, the casing 35B in the deshirred state is drawn out from the discharge port 21a while strengthening its degree of contact with the outer periphery of the stuffing nozzle 21 and rotating together with the stuffing nozzle 21. A continuous twist is imparted to the stuffed casing 46 at its constricted portion by the casing 35B in the deshirred state which continuously rotates together with the stuffing nozzle 21.

The aforementioned twisting of the casing 35 is continued until an ensuing constriction by the following pincher members 52 is completed. The pincher members 52 continue their continuous movement at a fixed speed, and the stuffing pump 22 continuously discharges the material into the casing 35B in the deshirred state pulled out from the discharge port 21a, thus continuously forming the plurality of stuffed casings 46.

Further, during stuffing, the trailing end portion 35E of the casing 35 is pushed to the forward side by the casing pushing member 40, which is intermittently driven, and the trailing end portion 35E is thereby pushed against the braking member 34b (FIG. 1). Meanwhile, air is jetted to the casing 35 from the below-described casing-use air nozzle 70, i.e., the third air supplying means, to thereby form a below-described casing rift 71 in the shirred portion 35A of the casing 35 (FIG. 9).

Figure 10:
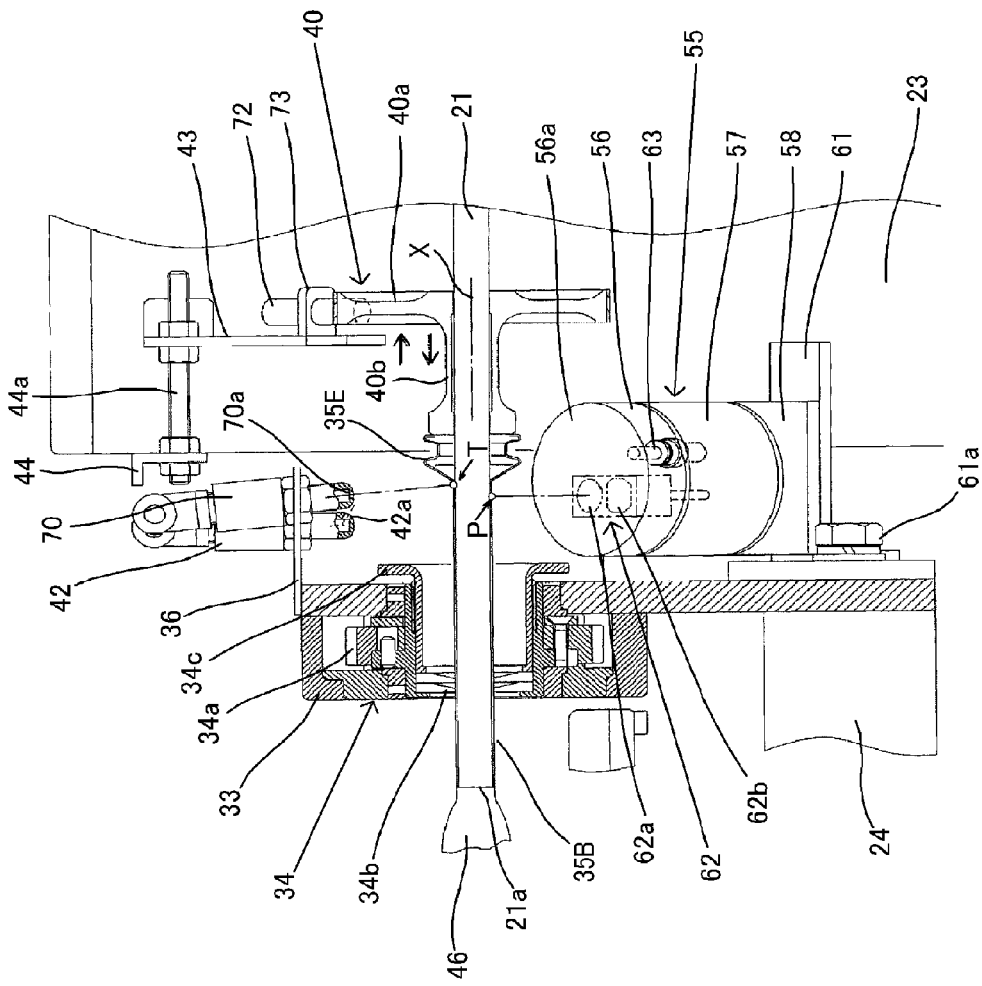
FIG. 10 is a diagram illustrating the state of a terminating end and its vicinity of the casing which is drawing to an end.

Subsequently, the casing pushing member 40 abuts against the stopper 43 and ceases to press the trailing end portion 35E of the casing 35. Thereafter, the air from the casing-use air nozzle 70 continues to form the casing rift 71 (FIG. 9). The casing trailing end portion 35E in the shirred state which is formed backwardly of the casing rift 71 is stretched to the forward side while being pulled by the casing 35 located forwardly of the casing rift 71 (FIGS. 9 and 10). Then, when the terminating end 35EE of the casing 35 appears, the photoelectric sensor 62 detects the quantity of light reflected from the stuffing nozzle 21 which appears following the terminating end 35EE (FIG. 11). The controller, upon receiving a signal thereof, stops the driving of all of the stuffing pump 22 and the like.

Next, a description will be given of the protective case 55 which is one of the characteristic features of the present invention. The protective case 55 is a tubular member with a circular cross section having a cap portion 56, a trunk portion 57, and a bottom portion 58. The cap portion 56 is a transparent acrylic lid-like member for forming an upper end portion of the protective case 55, and at least its upper surface portion is formed as a transparent portion 56a. In addition, an internal thread is formed on its inner peripheral surface.

The trunk portion 57 is a tubular nylon resin-made member with its upper and lower sides open, and an external thread is formed on an outer peripheral surface at its upper end, while an internal thread is formed on an inner peripheral surface at its lower end. The cap portion 56 is threadedly engaged with an upper portion of the trunk portion 57 through a packing 62d to thereby form an upper end threaded portion 56b.

Figure 4:
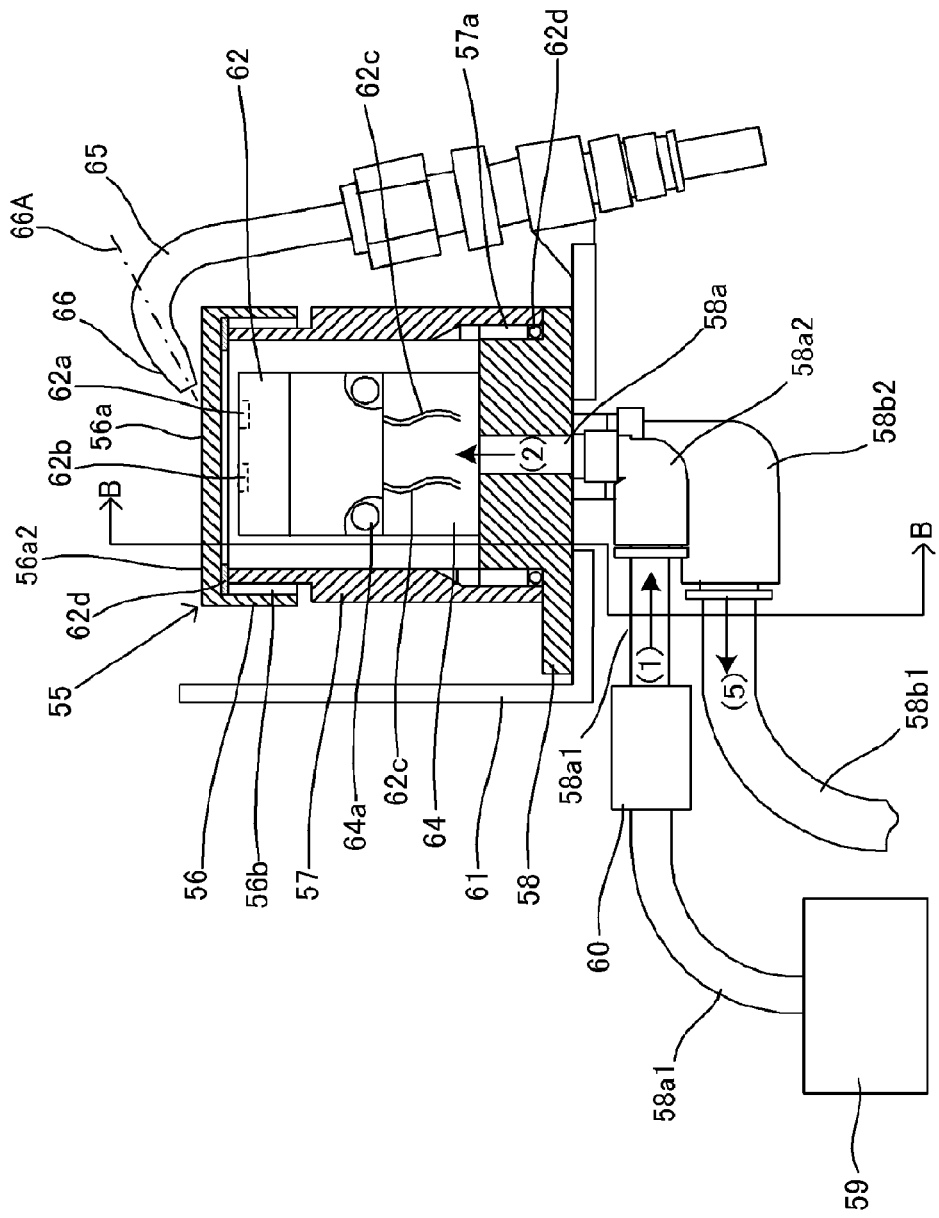
FIG. 4 is an enlarged cross-sectional view of a protective case and its vicinity.

The bottom portion 58 is a metallic member, has an external thread on its outer peripheral surface, and has a small-diameter opening 58a and a large-diameter opening 58b which penetrate vertically. The internal thread of the aforementioned trunk portion 57 is threadedly engaged with the external thread on the outer peripheral surface of the bottom portion 58 through a packing 62d to thereby form a lower end threaded portion 57a. In addition, as shown in FIG. 4, a compressor 59 and a filter 60 are connected to the small-diameter opening 58a, and air from the compressor 59, i.e., air from which water and dust have been filtered by the filter 60, is introduced into the protective case 55 through the small-diameter opening 58a, as shown by arrows (1) and (2), and is allowed to flow, as shown by an arrow (3), to thereby prevent the occurrence of dew condensation on an inner surface 56a1 of the transparent portion 56a. The aforementioned large-diameter opening 58b is for leading a lead wire 62c of the photoelectric sensor 62 to the outside, and air introduced into the protective case 55 through the small-diameter opening 58a is also discharged to outside the protective case 55 through this small-diameter opening 58a, as shown by arrows (4) and (5).

Since air introduced into the protective case 55 is thus discharged to outside the protective case 55 to consecutively effect replacement of air inside the protective case 55, it is possible to prevent the occurrence of dew condensation inside the protective case 55 and prevent dew condensation which can occur on the photoelectric sensor 62. It should be noted that the hole for exhausting air to the outside and the hole for leading out the lead wire 62c are jointly served by the large-diameter opening 58b, so that the bottom portion 58, i.e., the protective case 55, can be made compact, and it is possible to enlarge the range of adjustment of the position where the photoelectric sensor 62 is disposed with respect to the discharge port 21a of the stuffing nozzle 21.

After the three members of the protective case 55 are assembled, the protective case 55 is sealed by the packings 62d excluding the small-diameter opening 58a and the large-diameter opening 58b, thereby preventing the ingress of water and the like into the protective case 55 from above. It should be noted that although the protective case 55 has been described as being a three-split type, the protective case 55 may be a one-unit type, a two-split type, or four- or more split type insofar as it is capable of accommodating the photoelectric sensor 62 therein. Furthermore, its shape may be an elliptical, rectangular, or other similar shape. In particular, if the protective case 55 is made into a rectangular shape in which it is elongated in the left-right direction, it becomes possible to dispose the protective case 55 in close proximity to the braking mechanism 34 side, so that the protective case 55 can be made compact, its disposition is facilitated, and the degree of freedom in its disposition can be enhanced.

Further, as for this protective case 55, as shown in FIGS. 3 and 9, its transparent portion 56a is provided diagonally below the stuffing nozzle 21 so as to oppose the stuffing nozzle 21, and a lower side of the casing 35 is detected by the photoelectric sensor 62 provided in the protective case 55. In addition, a bracket 61 is attached to the bottom portion 58, and this bracket 61 is mounted on the second stand 24 by means of screws 61a.

It should be noted that since the protective case 55 is provided diagonally below, the confirmation of stains on an upper surface 56a2 of the transparent portion 56a by the operator H (FIG. 2) is facilitated, and since the upper surface 56a2 is located on the upper side, the stains are easy to flow therefrom. In addition, since the cap portion 56 is provided on the protective case 55, in a case where the transparent portion 56a has become scarred or tarnished, it is sufficient to replace that part alone, so that it is possible to hold down expenses. Furthermore, since the outer shape is made into a circular shape, the number of parts can be small in structure, and an O-ring can be used, thereby making the sealing structure easy and making it difficult for water to accumulate on its outer surface.

The photoelectric sensor 62 is provided in the protective case 55. The photoelectric sensor 62 is of a reflection type having an optical transmitter 62a and an optical receiver 62b, and is mounted on a supporting plate 64, which is erected on the bottom portion 58, by means of screws 64a. The optical transmitter 62a has three light-emitting elements which respectively emit three primary colors of light, while the optical receiver 62b is capable of generating electrical signals corresponding to quantities of light received in response to the respective three primary colors of light, and it is possible to use, for example, a photoelectric sensor (CZ-H35S) made by KEYENCE CORPORATION.

Further, the optical transmitter 62a and the optical receiver 62b of the photoelectric sensor 62 are provided in opposing relation to the transparent portion 56a of the protective case 55. As described above, as for the protective case 55, its transparent portion 56a is provided diagonally below the stuffing nozzle 21 so as to oppose the stuffing nozzle 21 (FIG. 3), the light F of the optical transmitter 62a is applied to a lower side of the casing 35, and its reflected light is detected by the optical receiver 62b, as shown in FIGS. 3 and 9.

Since an irradiation point P is located on the lower side of the stuffing nozzle 21 by virtue of the above-described construction, the irradiation point P is difficult to be affected by the illumination in the stuffing workroom, so that an error in detection of the casing 35 by the photoelectric sensor 62 becomes difficult to occur. It should be noted that the lead wire 62c connected to the photoelectric sensor 62 is led out from the large-diameter opening 58b to the outside. In addition, the large-diameter opening 58b is of such a size that the lead wire 62c can be led out with leeway, and the discharge of air is thereby allowed.

Incidentally, the detection accuracy of the photoelectric sensor 62 is affected by the transparency and flatness of the transparent portion 56a. By taking this into account, an adjustment mechanism is advantageously provided which makes variable an opposing interval D between an upper surface 62A of the photoelectric sensor 62 and the inner surface 56a1 of the transparent portion 56a. The adjustment mechanism may be arranged such that, for example, the installation height of the photoelectric sensor 62 with respect to the supporting plate 64 is made adjustable, or the installation height of the transparent portion 56a with respect to the trunk portion 57 is made adjustable.

As the photoelectric sensor, it is possible to use one which emits the three primary colors of light from the optical transmitter 62a and receives the three primary colors of light by the optical receiver 62b, but there can be cases where detection is possible and detection is not possible depending on the color of the casing 35. However, the quantity of reflected light respectively differs among the casing 35 in the state of being shirred in the direction of the axis X of the stuffing nozzle 21, the casing 35 in the state of being stretched in the direction of the axis X of the stuffing nozzle 21, and the stuffing nozzle 21. In addition, the above-described photoelectric sensor 62 is capable of detecting the respective different quantities of light from the casing 35 in the state of being shirred in the direction of the axis X of the stuffing nozzle 21, the casing 35 in the state of being stretched in the direction of the axis X of the stuffing nozzle 21, and the stuffing nozzle 21. Therefore, by using the above-described photoelectric sensor 62, it is possible to detect the terminating end 35EE of the trailing end portion 35E more reliably.

It should be noted that the photoelectric sensor 62 may be of a transmission type, or may be another known photoelectric sensor including a laser sensor. Furthermore, although air is constantly supplied, air may be supplied in a limited manner only during time zones when dew condensation occurs.

FIG. 9 shows the irradiation point P of the photoelectric sensor 62 (which is a point of intersection between the line of the axis, shown by the dashed-dotted line, of the photoelectric sensor 62 and the stuffing nozzle 21, i.e., a point indicated by a small circle). The irradiation point P is provided at a position which is located forwardly of the position where the casing pushing member 40 abuts against the stopper 43 and which is located forwardly of a below-described colliding portion T where the air jetted from a jetting port 70a of the casing-use air nozzle 70, i.e., the third air supplying means, abuts against the casing 35. However, the irradiation point P may be provided at the same position as the colliding portion T in the direction of the axis X of the stuffing nozzle 21, or may be provided slightly backwardly thereof within a range that the detection error does not occur. At any rate, the irradiation point P is provided at such a position that the trailing end portion 35E of the casing 35 which has passed the irradiation point P does not reach the discharge port 21a of the stuffing nozzle 21 before the stuffing pump 22, upon receiving a material stop signal, completes the stopping of the material.

Figure 5:
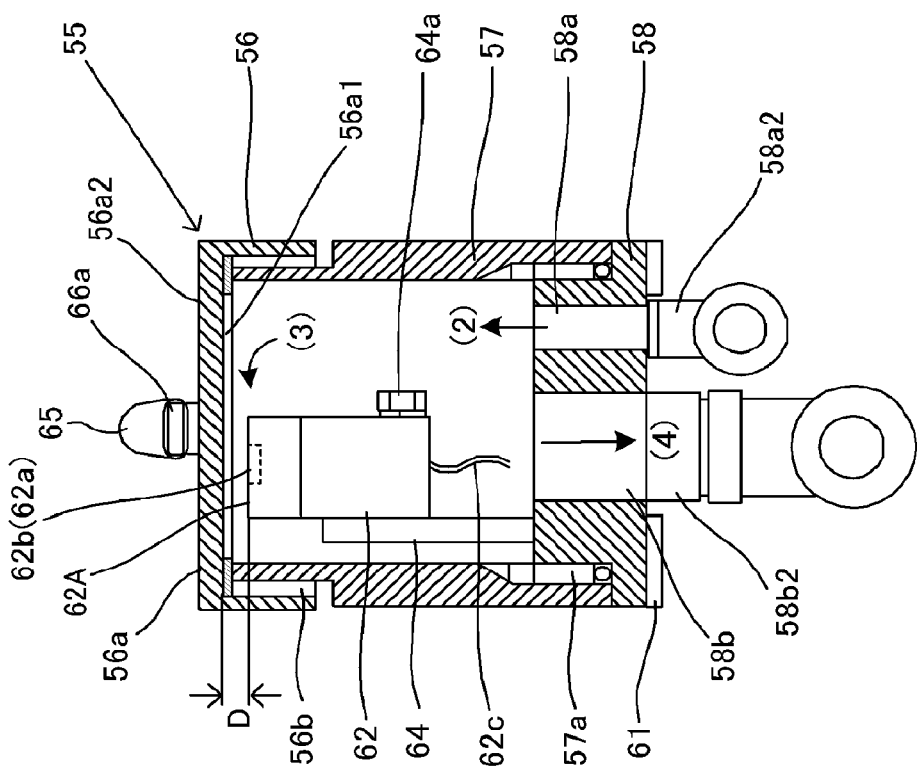
FIG. 5 is a view taken from the direction of line B-B in FIG. 4.
Figure 7:
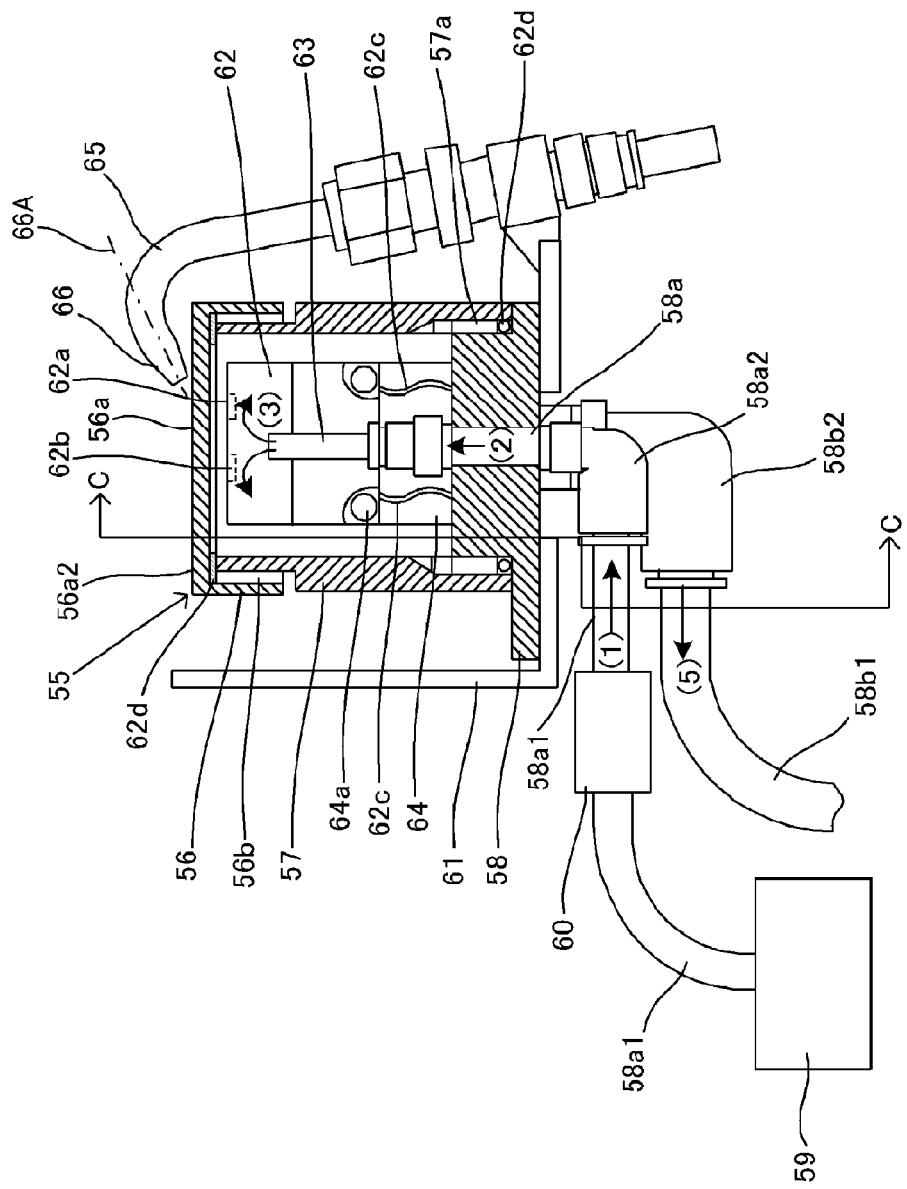
FIG. 7 is an enlarged cross-sectional view of an example in which the air nozzle is provided inside the protective case.
Figure 8:
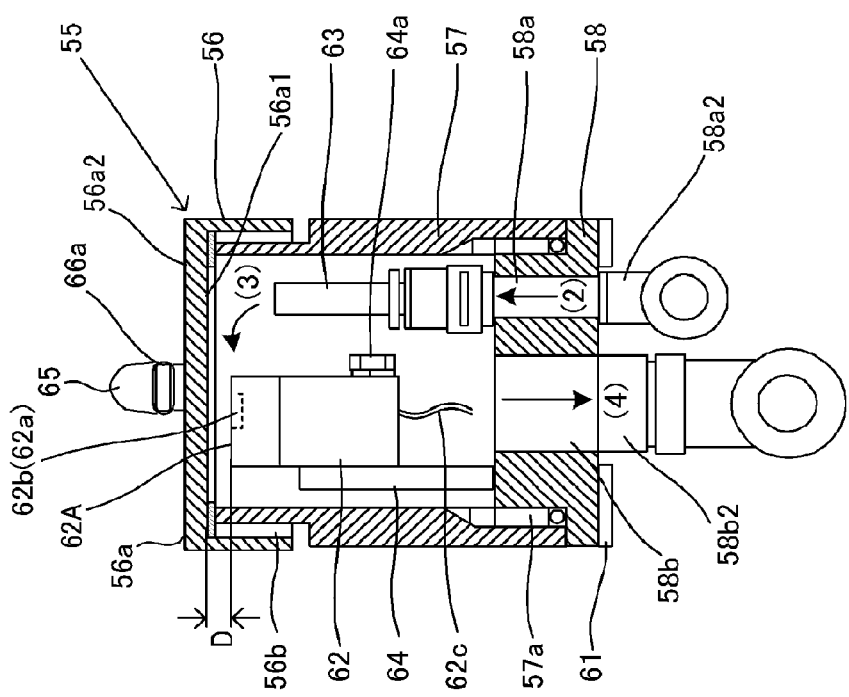
FIG. 8 is a view taken from the direction of line C-C in FIG. 7.

FIGS. 7 and 8 show a different example for supplying air into the protective case 55. In the example shown in FIGS. 4 and 5, air is jetted from the small-diameter opening 58a and is supplied into the protective case 55, but in this example shown in FIGS. 7 and 8, the air nozzle is provided in the interior. Namely, as shown in the drawings, an air nozzle 63 is provided in the small-diameter opening 58a.

This air nozzle 63 is provided in a form in which it is erected in and from the small-diameter opening 58a, and its distal end is open in the vicinity of the transparent portion 56a. Further, in the same way as the arrangement shown in FIG. 4, the compressor 59 and the filter 60 are connected thereto, and air from the compressor 59, i.e., air from which water and dust have been filtered by the filter 60, is introduced into the protective case 55 through the small-diameter opening 58a and the air nozzle 63, as shown by arrows (1) and (2), and is directly applied to the inner surface 56a1 of the transparent portion 56a, as shown by an arrow (3), to thereby prevent the dew condensation on the inner surface 56a1 of the transparent portion 56a.

The air from the air nozzle 63 is directly abutted against the inner surface 56a1 of the transparent portion 56a, so that the dew condensation on that inner surface 56a1 can be reliably prevented by a small amount of air, with the result that the detection accuracy of the photoelectric sensor 62 can be increased. In addition, it is possible to prevent early failure of the photoelectric sensor 62 caused by the occurrence of dew condensation on the photoelectric sensor 62 due to the temperature difference. It should be noted that although the air from the aforementioned air nozzle 63 is constantly supplied, air may be supplied in a limited manner only during time zones when dew condensation occurs.

A tube 58a1 for supplying air to the protective case 55 is connected to the small-diameter opening 58a by means of a joint 58a2, while a tube 58a1 for exhausting air from the protective case 55 is connected to the large-diameter opening 58b by means of a joint 58b2, and the tube 58b1 extends to a desirable place where the air is exhausted from the tube 58b1 to the outside. It should be noted that the lead wire 62c of the photoelectric sensor 62 is passed through the tube 58b1, and the lead wire 62c is protected by the tube 58b1.

In addition, an upper surface-use air nozzle 65, which is a second air supplying means, is provided on the bracket 61 for mounting the protective case 55. This upper surface-use air nozzle 65 has at its distal end a distal end portion 66 which is bent substantially orthogonally, such that when the upper surface-use air nozzle 65 is installed on the bracket 61, the distal end portion 66 slightly enters the interior of the upper surface 56a2 of the protective case 55, and its axis 66A is set in a state in which it extends in a direction intersecting the upper surface 56a2.

Figure 6:
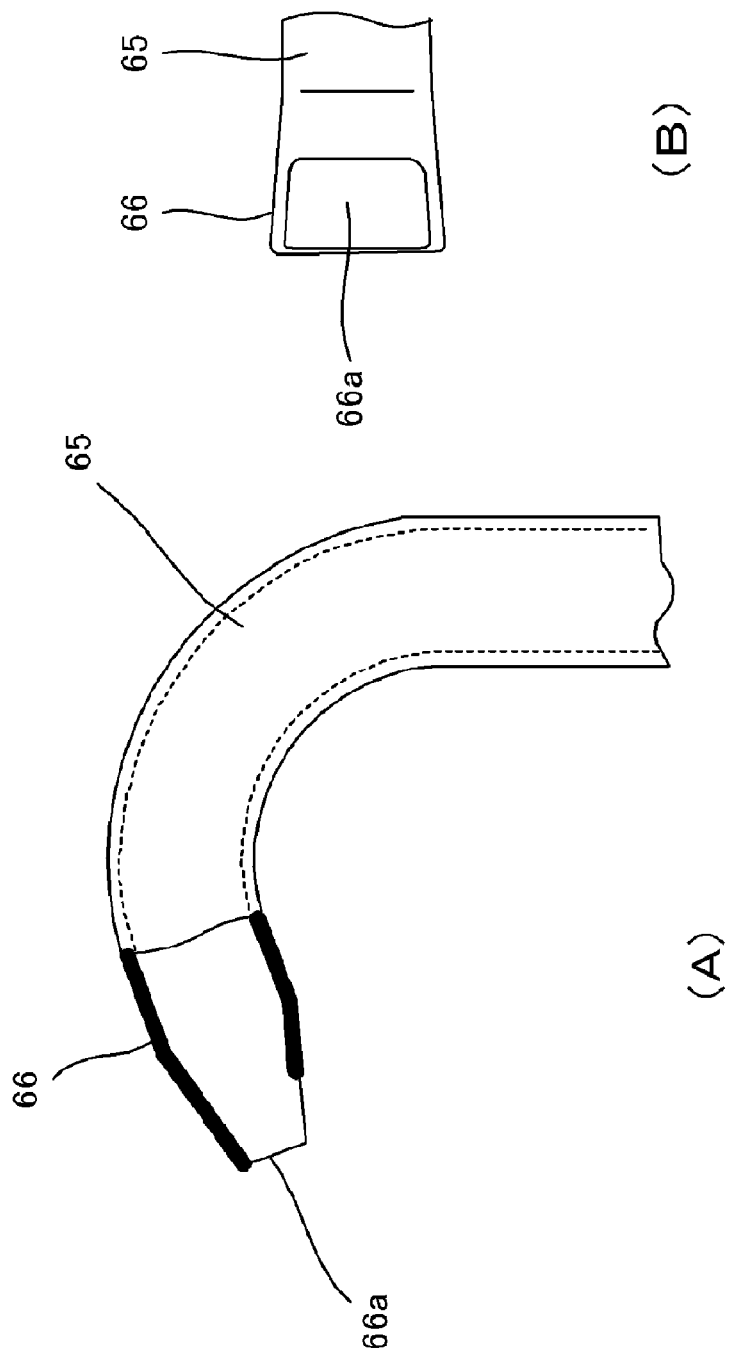
FIG. 6(A) is a view in which a distal end of an air nozzle for supplying air toward the outer surface of a transparent portion of the protective case is viewed laterally.
FIG. 6(B) is a view in which the distal end of that air nozzle is viewed from below.

As shown in FIG. 6, a transversely elongated and rectangular nozzle opening 66a is provided below the aforementioned distal end portion 66 in such a manner as to oppose the upper surface 56a2 in a state of being substantially parallel to the upper surface 56a2. Air is jetted from this nozzle opening 66a onto the upper surface 56a2 of the protective case 55. When the air is jetted onto the upper surface 56a2 of the protective case 55, the air flows along the upper surface 56a2 while colliding against the upper surface 56a2 to thereby remove such as water and the material on the upper surface 56a2.

As the air is thus directly blown onto the upper surface 56a2 from the vicinity of the upper surface 56a2, it is possible to efficiently remove such as water and the material on the upper surface 56a2 with a small amount of air. It should be noted that air from the upper surface-use air nozzle 65 is jetted intermittently, such as by being jetted for 0.3 second and halted for 1 second. Nevertheless, the air may be jetted continuously.

The nozzle opening 66a is disposed by being offset from the optical transmitter 62a and the optical receiver 62b of the photoelectric sensor 62 (FIG. 5), and the size of the nozzle opening 66a is set to be smaller than upper surface areas of the optical transmitter 62a and the optical receiver 62b of the photoelectric sensor 62. However, the material and the like shielding the light from the optical transmitter 62a and the optical receiver 62b can be reliably blown off from the upper surface 56a2 by the air jetted from the air nozzle 63. It should be noted that the size of this nozzle opening 66a may be varied, as required, and may, for instance, be of such a size as to be able to cover the entire upper surface of the protective case 55.

Reference numeral 70 denotes the casing-use air nozzle which is the third air supplying means. As shown in FIG. 9, this casing-use air nozzle 70 is installed on the air nozzle supporting plate 36 mounted on the second stand 24 in such a form that the small-diameter jetting port 70a is set on the lower side, and the casing-use air nozzle 70 is inclined slightly backwardly.

The aforementioned jetting port 70a is located in the vicinity of the casing 35, and when air is jetted from the jetting port 70a toward the casing 35, the air presses onto the stuffing nozzle 21 the casing 35 at the colliding portion T (which is a point of intersection between the line of the axis, shown by the dashed-dotted line, of the casing-use air nozzle 70 and the stuffing nozzle 21, i.e., a point indicated by a small circle) where the air abuts. Then, the air expands about the axial line and collides against the casing 35, so that the casing rift 71 is produced at that portion.

Incidentally, if the casing 35 is excessively pushed by the casing pushing member 40, the casing 35A in the shirred state (FIG. 1) which is sandwiched between and pressed by the braking member 34b and the casing pushing member 40 is difficult to be drawn out from the braking member 34b, and the creases in the shirred state are difficult to extend. Therefore, the creases in the shirred state are made easy to extend by intermittently pushing the casing pushing member 40.

As described above, if the casing rift 71 is produced by the casing-use air nozzle 70, the casing 35A located forwardly (braking member 34b side) of that casing rift 71 is subjected to a weaker pushing force from the casing pushing member 40, and the creases are hence made easy to extend. Accordingly, through the concomitant use of the casing pushing member 40 which is intermittently operated, it becomes possible to use even thin natural intestine casings while substantially reducing the risk of their breakage.

Next, a description will be given of the operation whereby the trailing end portion 35E of the casing in the shirred state is stretched.

The casing 35A in the shirred state located forwardly of the casing rift 71 is pulled by the casing 35B in the deshirred state and is consecutively drawn out to the forward side from the braking member 34b (FIG. 1). As the casing 35A in the shirred state is drawn out from the braking member 34b, the casing 35B in the deshirred state extends and increases from the braking member 34*b* toward the casing rift 71 (FIG. 9), and the casing rift 71 is ultimately extinguished, so that the casing 35B in the deshirred state stretched in the direction of the axis X of the stuffing nozzle 21 is formed between the braking member 34*b* and the colliding portion T (FIG. 10).

Meanwhile, after the abutment of the casing pushing member 40 against the stopper 43, air is intermittently supplied from the air nozzles 41 and 42 to the casing pushing member 40 such that the casing pushing member 40 repeats forward movement and backward movement with respect to the stopper 43 (FIG. 10), as shown by arrows. When the casing pushing member 40 moves away from the stopper 43 to the backward side, the casing trailing end portion 35E in the shirred state is stretched to the backward side and its degree of shirring is alleviated by a crease-backward-extending force which the rotating casing trailing end portion 35E in the shirred state has (FIG. 10). As a result, it is possible to reduce the adverse effect of the casing trailing end portion 35E becoming wrapped around and onto the stuffing nozzle 21. It should be noted that the amount of air supplied from the returning-use air nozzle 42 to the casing pushing member 40 may be increased so that the casing pushing member 40 moves away from the casing trailing end portion 35E which is stretched to the backward side.

When the trailing end portion 35E in the shirred state formed backwardly of the colliding portion T moves by being pulled to the forward side by the casing 35B in the deshirred state, this trailing end portion 35E in the shirred state is pressed against the stuffing nozzle 21 at the colliding portion T by the air from the casing-use air nozzle 70. Consequently, the casing trailing end portion 35E in the shirred state is reliably stretched in the direction of the axis X of the stuffing nozzle 21 up to the terminating end 35EE while moving to the forward side (FIG. 11).

As shown in FIG. 9, the colliding portion T is provided backwardly of the irradiation point P of the photoelectric sensor 62. For this reason, it becomes possible to accurately detect the terminating end 35EE of the aforementioned stretched casing 35 by the photoelectric sensor 62 (FIG. 11). In consequence, it is possible to eliminate the adverse effect that the casing 35 in the shirred state passes the photoelectric sensor 62, and the stuffing operation ends in a state in which the casing 35 is left in a large quantity.

Reference numeral 72 denotes a casing pushing member sensor for detecting the casing pushing member 40 which has abutted against the stopper 43 and has stopped. The casing pushing member sensor 72 is used only for a below-described second form of air jetting. As shown in FIGS. 3 and 9, the casing pushing member sensor 72 is mounted on a sensor bracket 73 secured to the backward side of the stopper 43. The sensor 72 extends diagonally downward from the sensor bracket 73 so as to allow a detecting portion 72*a* to detect the casing pushing member 40.

Next, a description will be given of the forms of air jetting from the casing-use air nozzle 70.

In a first form, the arrangement provided is such that, during the period from a stuffing start until a stuffing end, air from the casing-use air nozzle 70 is jetted for 1 second and is halted for 0.3 second in synchronism with the air supply from the pushing-use air nozzle 41, thereby effecting intermittent jetting. By so doing, during the period from the stuffing start until the casing pushing member 40 abuts against the stopper 43, the casing rift 71 can be intermittently formed in the casing 35A in the shirred state (FIG. 1).

As a second form, the jetting of air from the casing-use air nozzle 70 may be started by a detection signal from the casing pushing member sensor 72, and air may be jetted only to the vicinity of the trailing end portion 35E of the casing 35. By so doing, since the casing rift 71 is not formed in the casing 35A in the shirred state until the casing pushing member 40 abuts against the stopper 43, the pressing force of the casing pushing member 40 which is applied to the casing 35A in the shirred state does not decrease. By virtue of such a form, the moving distance of the casing 35 which slides on the stuffing nozzle 21 in the deshirred state becomes small, so that this form is suitable in the use of a casing 35 whose sliding on the stuffing nozzle 21 is poor. It should be noted that the air from the casing-use air nozzle 70 may be jetted continuously.

In addition, as shown in FIG. 3, the jetting direction of air from the jetting port 70*a* of the casing-use air nozzle 70 is offset a distance S from the axis X of the stuffing nozzle 21 toward a rotating direction R side of the stuffing nozzle 21. By providing the jetting port 70*a* at such a position, the casing 35 receives the air in the rotating direction R without being pressed against the stuffing nozzle 21 more than is necessary, so that it is possible to reduce the adverse effect of the casing 35 being wrapped around and onto the stuffing nozzle 21.

As described above, in this embodiment, since the casing-use air nozzle 70 is provided, the restriction of the pressing of the casing 35A in the shirred state against the braking member 34*b* and the braking of the forward movement of the casing trailing end portion 35E in the shirred state are effected. In consequence, the drawing out of the casing 35 from the braking member 34*b* is facilitated, and the casing trailing end portion 35E in the shirred state can be reliably stretched to the forward side.

Since the stopper 43 is provided in this embodiment, the restriction of the pressing of the casing 35A in the shirred state against the braking member 34*b* and the restriction (in the direction of the axis X of the stuffing nozzle 21) of the pressing of the casing trailing end portion 35E in the shirred state against the colliding portion T are effected. In consequence, the drawing out of the casing 35 from the braking member 34*b* is facilitated, the wrapping of the casing trailing end portion 35E in the shirred state around and onto the stuffing nozzle 21 is reduced, and the casing trailing end portion 35E in the shirred state can be reliably stretched to the forward side.

In this embodiment, the pressing of the casing 35 against the stuffing nozzle 21 is effected by air from the casing-use air nozzle 70, and the casing pushing member 40 is pushed by air from the pushing-use air nozzle 41. Therefore, the drawing out of the casing 35 from the braking member 34*b* is facilitated, the wrapping of the casing trailing end portion 35E in the shirred state around and onto the stuffing nozzle 21 is reduced, and the casing trailing end portion 35E in the shirred state can be reliably stretched to the forward side.

The present invention is not limited to the construction of the above-described embodiment, appropriate design changes are possible within the scope that does not depart from the gist of the invention, and the following invention is included, for example.

1. A protective case characterized in that a photoelectric sensor is accommodated in the protective case having a transparent portion, and air supplying means for supplying air into the protective case is provided on the protective case.

2. The protective case according to 1 above, wherein the air supplying means has an air nozzle which is provided in the protective case and jets air toward an inner surface of the transparent portion.

3. The protective case according to 1 above, wherein second air supplying means is provided for supplying air toward an outer surface of the transparent portion.

4. Invention concerning other forms of the structure of the protective case.

As described above, the invention merely concerns the protective case (in which case, the object is to provide a protective case whereby detection by the detecting means can be effected more accurately).

5. A detecting structure for a stuffing apparatus including a stuffing nozzle having a material discharge port and a photoelectric sensor for detecting a terminating end of a casing loaded on an outer periphery of the stuffing nozzle, wherein a third air supplying means for supplying air toward the casing is provided.

6. The detecting structure for a stuffing apparatus according to 5 above, wherein the direction of supplying air by the third air supplying means is offset from an axis of the stuffing nozzle toward a rotating direction side of the stuffing nozzle.

7. Invention concerning other forms of the structure of the third air supplying means.

8. The detecting structure for a stuffing apparatus according to 5 above, wherein a fifth air supplying means for supplying air toward the casing pushing member is provided.

As described above, the invention concerns the casing pushing member or/and the third air supplying means or/and the fifth air supplying means, excluding the protective case (in which case, the object is the same as that of the invention described in the embodiment).

The invention claimed is:

1. A detecting structure for a stuffing apparatus comprising: a stuffing nozzle having a material discharge port and a photoelectric sensor for detecting a terminating end of a casing loaded on an outer periphery of said stuffing nozzle, wherein said photoelectric sensor is accommodated in a protective case having a transparent portion, and air supplying means for supplying air into said protective case is provided on said protective case.

2. The detecting structure for a stuffing apparatus according to claim 1, wherein said air supplying means has an air nozzle which is provided in the protective case and jets air toward an inner surface of the transparent portion.

3. The detecting structure for a stuffing apparatus according to claim 1, wherein second air supplying means is provided for supplying air toward an outer surface of the transparent portion.

4. The detecting structure for a stuffing apparatus according to claim 1, wherein third air supplying means is provided for supplying air toward the casing.

5. The detecting structure for a stuffing apparatus according to claim 4, wherein a direction of supplying air by said third air supplying means is offset from an axis of said stuffing nozzle toward a rotating direction side of said stuffing nozzle.

6. The detecting structure for a stuffing apparatus according to claim 4, wherein a casing pushing member for pushing a trailing end portion of the casing is stopped short of said photoelectric sensor.

7. The detecting structure for a stuffing apparatus according to claim 1, wherein said photoelectric sensor has an optical transmitter and an optical receiver, said optical transmitter has three light-emitting elements which respectively emit three primary colors of light, and said optical receiver generates electrical signals corresponding to quantities of light received in response to the respective three primary colors of light.

* * * * *